United States Patent [19]

Lee

[11] Patent Number: 4,724,113
[45] Date of Patent: Feb. 9, 1988

[54] METHOD OF MOLDING USING AN INFLATABLE SEAL

[75] Inventor: Janet D. Lee, Walnut Creek, Calif.

[73] Assignee: The Dow Chemical Company, Midland, Mich.

[21] Appl. No.: 809,457

[22] Filed: Dec. 16, 1985

[51] Int. Cl.$^4$ .................................................. B29C 39/28
[52] U.S. Cl. ........................................ 264/276; 49/477;
210/500.23; 249/65; 264/275; 264/279;
264/279.1; 264/315; 269/20; 269/22; 277/1;
277/34.3; 277/226; 425/389; 425/DIG. 47
[58] Field of Search ............... 264/275, 276, 278, 279,
264/279.1, 315, DIG. 50; 425/389, DIG. 19,
DIG. 47, DIG. 242; 249/65; 269/20, 22;
277/34.3, 226, 1; 49/477; 210/500.23

[56] References Cited

U.S. PATENT DOCUMENTS

| | | |
|---|---|---|
| 1,567,286 | 12/1925 | Moore et al. |
| 1,665,445 | 4/1928 | Conrad. |
| 2,239,989 | 4/1941 | Britton .............................. 249/65 X |
| 2,284,741 | 6/1942 | Johnston . |
| 3,231,947 | 2/1966 | Newton . |
| 3,513,905 | 5/1970 | Olson .................................. 164/380 |
| 3,788,651 | 1/1974 | Brown et al. ...................... 277/34 |
| 3,832,438 | 8/1974 | Ditcher ............................... 264/274 |
| 4,153,656 | 5/1979 | Bunyan ............................ 264/279 X |
| 4,178,000 | 12/1979 | Kuttner ........................... 277/226 X |
| 4,434,962 | 3/1984 | Bleuel et al. ...................... 249/65 |
| 4,477,399 | 10/1984 | Tilton .............................. 249/65 X |
| 4,626,185 | 12/1986 | Monnet ........................ 264/279.1 X |

Primary Examiner—Jeffery Thurlow
Assistant Examiner—Leo B. Tentoni
Attorney, Agent, or Firm—Norman L. Sims

[57] ABSTRACT

The invention is a mold adapted for forming a member from a thermoset or thermoplastic resin about a substrate at a distance from the end of the substrate without leaking of the thermoplastic or thermoset material onto the portion of the substrate between the end and the starting point of the member being formed about the substrate, wherein the mold comprises (A) a mold casing adapted for forming a member from a thermoset or thermoplastic material about a substrate at a distance from the end of the substrate, (B) an inflatable seal adapted for forming a seal about the substrate when inflated at a distance from the end of the substrate such that the thermoset or thermoplastic material is contained to the area of the substrate about which the member is to be formed, (C) a means for inflating the seal such that the seal can form a seal about the substrate at a distance from the end of the substrate.

This invention further relates to a method of using such a mold to form a member from a thermoplastic or thermoset material about a substrate at some distance from the end of such a substrate. The novel mold and method of this invention allows the formation of a member from a thermoplastic or thermoset material about a substrate at a position some distance from the end of a substrate.

11 Claims, 5 Drawing Figures

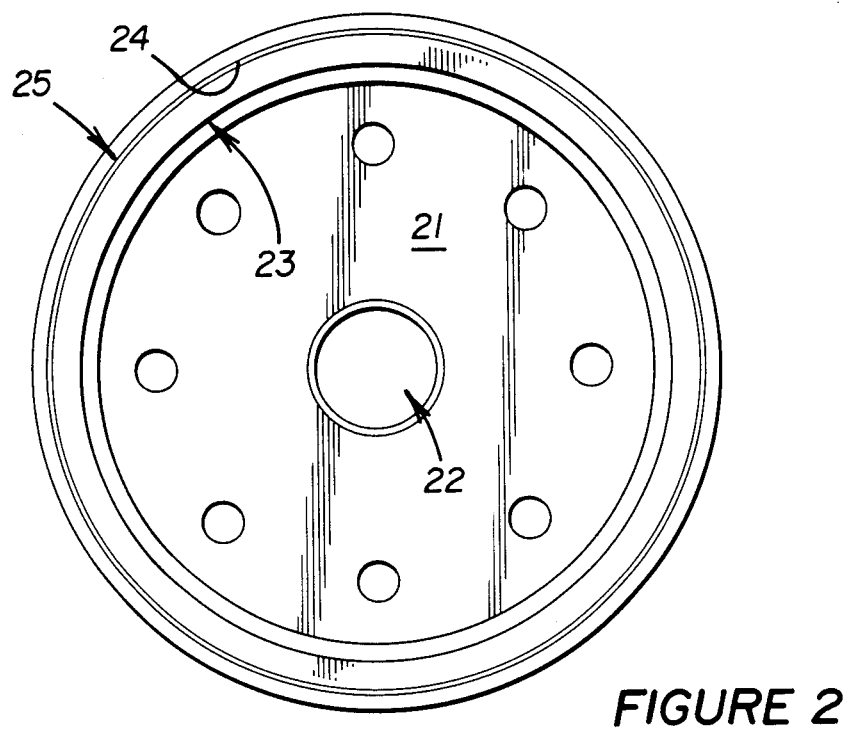
FIGURE 2
FIGURE 1
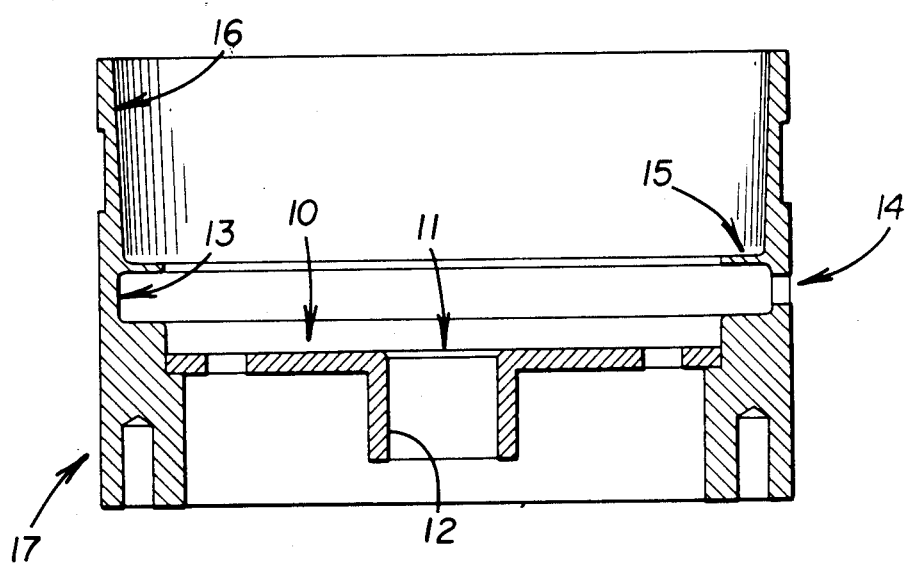

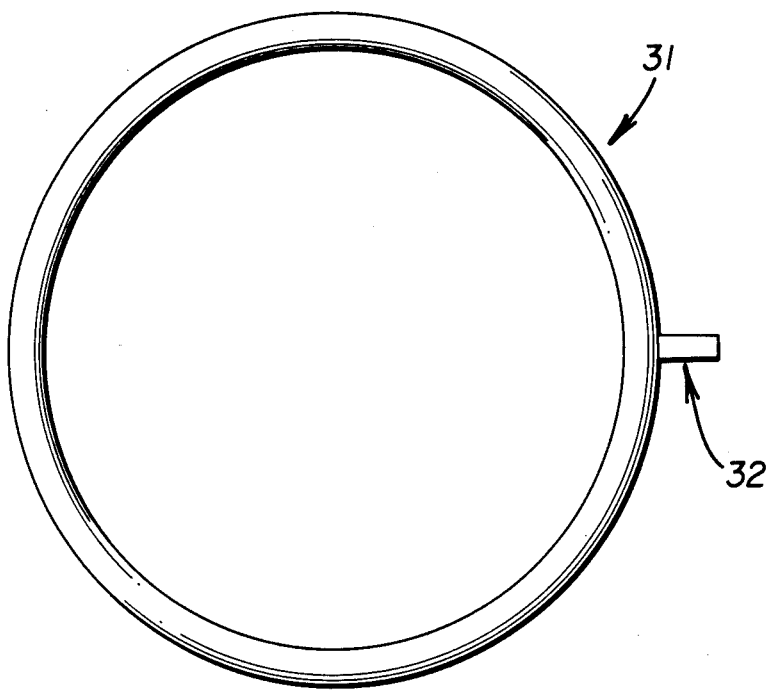
FIGURE 3
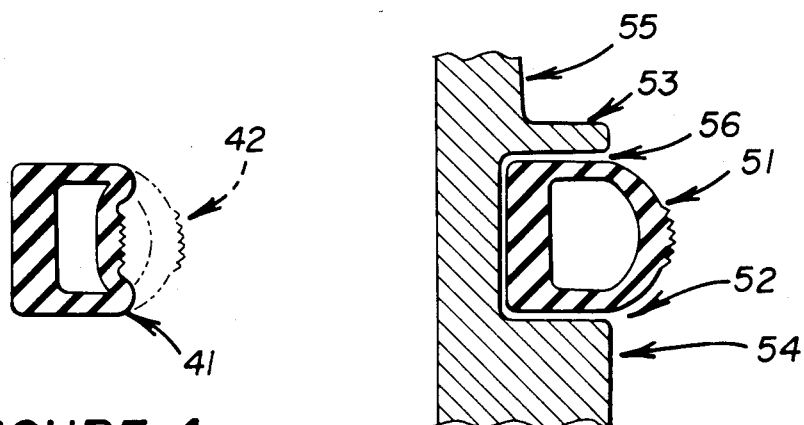
FIGURE 4
FIGURE 5

METHOD OF MOLDING USING AN INFLATABLE SEAL

BACKGROUND OF INVENTION

This invention relates to a novel mold adapted for forming a member from a thermoplastic or thermoset material around a substrate, at some distance from the end of such a substrate. This invention further relates to a novel method for the formation of such a member on a substrate at a distance from the end of said substrate.

The use of molds to form members from thermoset or thermoplastic materials around substrates is well known. One problem in such an operation is the formation of such a member at some distance from the end of the substrate. One particular example is the formation of a flange on the tubesheet of a hollow fiber membrane device. Such membrane devices generally comprise a bundle of hollow fibers wrapped in some fashion about a core, wherein the hollow fibers are held in place by one or more tubesheets. Generally, such bundle of hollow fibers is in the shape of a cylinder. In use, such bundles of hollow fibers or hollow fiber membrane devices are placed inside of a casing. In order to accommodate the placement of the device in a casing, a flange must be placed or formed about the tubesheet of the hollow fiber membrane device. In one method of preparation of the hollow fiber bundle, the hollow fibers are wrapped about the core simultaneously with the formation of the one or more tubesheets. After wrapping the hollow fibers on the core and forming the tubesheet, it is often necessary to form a flange on the tubesheet to enable the placement of the hollow fiber bundle into a casing, along with the accommodation of a seal to seal portions of the hollow fiber device inside the casing from other portions. In many instances, the flange is not formed on the tubesheet or tubesheets at the end of the membrane device and placement of the flange on the tubesheet can become difficult, as the membrane devices are not fabricated to particularly tight tolerances and contain indentations and grooves. Furthermore, it has been in the past required the machining of the ends of the device until you reach the point where you would like the flange to be located. The flange material is then applied and machining is done again to shape the flange to its final dimension. This extra machining is costly and results in extra handling of the hollow fiber device before the casing is placed over the membrane device.

What is needed is process for the formation of a thermoplastic or thermoset member about a substrate at some distance from the end of the substrate wherein the thermoplastic or thermoset material can be kept from leaking onto the extreme end of such substrate. Furthermore, a mold and method which would prevent unnecessary handling or machining of such substrates is highly desirable.

SUMMARY OF THE INVENTION

The invention is a mold adapted for forming a member from a thermoset or thermoplastic resin about a substrate at a distance from the end of the substrate without leaking of the thermoplastic or thermoset material onto the portion of the substrate between the end and the starting point of the member being formed about the substrate, wherein the mold comprises (A) a mold casing adapted for forming a member from a thermoset or thermoplastic material about a substrate at a distance from the end of the substrate, (B) an inflatable seal adapted for forming a seal about the substrate when inflated at a distance from the end of the substrate such that the thermoset or thermoplastic material is contained to the area of the substrate about which the member is to be formed, (C) a means for inflating the seal such that it can form a seal about the substrate at a distance from the end of the substrate.

This invention further relates to a method of using such a mold to form a member from a thermoplastic or thermoset material about a substrate at some distance from the end of such a substrate.

The novel mold and method of this invention allows the formation of a member from a thermoplastic or thermoset material about a substrate at a position some distance from the end of a substrate. Furthermore, the novel mold and method of this invention allow the formation of such a member about a substrate which does not meet particularly tight tolerances, or which has slight grooves and indentations therein. Furthermore, this novel mold and method allow such a formation without requiring unnecessary machining and handling of the members so formed, or the substrates about which such members are formed.

BRIEF DESCRIPTION OF THE FIGURES

The figures demonstrate five views of one preferred embodiment of the mold of this invention. FIG. 1 is a side view of a preferred embodiment of the mold of this invention. FIG. 2 is a top view of the mold. FIG. 3 is a top view of a seal used in such mold. FIG. 4 is a cut away side view of a seal useful in the mold of this invention. FIG. 5 demonstrates a cutaway side view of an inflated seal in the groove of a mold of this invention.

DETAILED DESCRIPTION OF INVENTION

The novel mold and method of this invention can be used to form a member on any substrate where it is desired to form a member at some distance from the end of the substrate and where it is further desirable to prevent the leakage of the material used to form the member onto the end of the substrate. Substrate refers herein to any object about which a member may be formed, wherein such member can be formed at some distance from an end of the substrate. Preferably, the substrate has a clearly defined longitudinal access. More preferably, the substrate has a flat end. In one more preferred embodiment, the substrate is of cylindrical shape with a flat endpiece. A member can be any size or shape and is used herein to refer to an attachment of any shape, derived from a thermoplastic or thermoset material, which is adhered to a substrate, wherein such member is at some distance from the end of the substrate. This member is molded about and adhered to the substrate using the mold and method of this invention. Preferably, the member encircles a portion of the substrate. The member itself preferably takes a cyindrical shape of a diameter greater than the diameter of any cylindrical substrate about which it is adhered to. In one preferred embodiment, the member is a flange adhered about a substrate which comprises a hollow fiber bundle bound together by a tubesheet, wherein the flange is specifically adhered to the tubesheet of such hollow fiber bundle.

The thermoset or thermoplastic material which may be used to form such flange can be any thermoset or thermoplastic material which can be molded and cured. Preferably, such thermoset or thermoplastic materials are those materials useful in preparing tubesheets and flanges for hollow fiber membrane devices. Examples of such materials include artificial and natural rubbers, phenolaldehydes, acrylic resins, polysiloxanes, polyurethanes and epoxy resins.

Preferably, the members are prepared from epoxy resins. Any epoxy resin which adheres to and provides stability to a hollow fiber membrane device once cured in the manner described hereinafter can be used in this invention. Polyepoxide resins which are desirable for the resin formulations of this invention include glycidyl polyethers of polyhydric phenols.

Illustrative of the polyhydric phenols are mononuclear phenols, polynuclear phenols and included within the latter are the phenol-aldehyde condensation resins commonly known as novolac resins. Typical mononuclear phenols include resorcinol, catechol, hydroquinone, phloroglucinol and the like. Examples of polynuclear phenols include 2,2bis(4-hydroxyphenyl)propane(bisphenol A), 4,4'-dihydroxy-benzophenone, 1,1-bis(4-hydroxyphenyl)ethane, bis(2-hydroxynaphthyl)methane, 2,2-bis(4-hydroxyphenyl)-butane, 4,4'-dihydroxyphenyl phenyl sulfone and the like. Novolac resins include the condensation products of phenol-formaldehyde and the like.

The preparation of such resins is well known and is described in a number of patents such as U.S. Pat. No. 2,935,488 and others and in textbooks such as Lee and Neville, "Handbook of Epoxy Resins", McGraw-Hill Book Co., 1967 (both incorporated herein by reference).

Preferred epoxy resins are those resins derived from bisphenol A, e.g., diglycidyl ethers of bisphenol A. Such preferred resins generally correspond to the formula

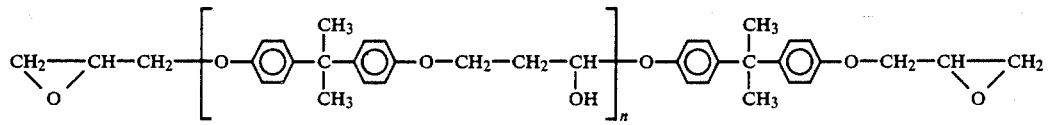

wherein n is a positive real number of between about zero and 20, more preferably between about zero and 10, more preferably between about zero and 5.

Thermoset materials prepared from epoxy resins are prepared by curing the agent, and optionally a catalyst which promotes the curing of the resin. The curing agent can be any known epoxy curing agent; see U.S. Pat. No. 2,935,488, for example an anydride, amine, or carboxylic acid based curing agent. The preferred curing agents are the amines.

The mold casing of this invention can be prepared from any material which is stable to the conditions used for forming the member about the substrate. In one embodiment, the casing can be prepared from steel. In a more preferred embodient, the inside portion of the mold casing is coated with TEFLON* tetrafluoroethylene fluorocarbon polymers (*trademark of DuPont de Nemours Company) so as to allow or facilitate release of the molded member once the thermoplastic or thermoset material has cured.

Preferably, the mold casing contains a groove wherein the inflatable seal is seated. This groove communicates completely around the mold so as to allow the formation of two areas within the mold, one being that area wherein the end of the substrate is placed and which is sealed off from any thermoset or thermoplastic material, and a second area in which the member is formed about the substrate. In that embodiment wherein the substrate is cylindrical, the casing is also cylindrical and the groove so described is circular and located at some point between one end of the casing and the other end of the casing.

In a preferred embodiment, the mold case has a flat bottom and the sides are arranged in a cylindrical manner. Preferably, such a mold case is designed such that that portion of the mold case in which the end of the substrate is placed has a cross-sectional area approximating that cross-sectional area of the substrate, with the proviso that the substrate can fit therein. In such embodiment, that area of the mold casing, wherein the substrate about which the member is to be formed, has a larger cross-sectional area than the area of the mold casing about the end portion of the substrate, such cross-sectional area being large enough to form the appropriate sized member about the substrate. These two areas of the mold case are separated by the inflatable seal in a manner such that when inflated the seal prevents communication of thermoset or thermoplastic material between the two areas of the mold case wherein a portion of a substrate is contained in the mold.

That area wherein the member is formed preferably has an outward taper so that once the thermoset or thermoplastic material has cured the substrate and member formed thereon may be easily removed from the mold. Preferably, this outward taper is between about 2° and 10° C., preferably between about 2° and 7° C. The lower the taper, the less handling and machining there is required for further processing of the member and substrate.

In one preferred embodiment, the mold further comprises some heating means adapted for enhancing the cure rate of the thermoset or thermoplastic material. Any heating means known to the skilled artisan can be used for such a purpose.

The inflatable seal generally comprises a material which has sufficient elasticity that when pressurized will stretch and form a seal about a substrate which does not necessarily meet exacting tolerance specifications and which may contain grooves and indentations. Furthermore, such a material must be of sufficient strength to withstand the pressures and temperatures used in the preparation of the member. The material selection must take into consideration the temperature, atmospheric conditions, flex requirements, mode of operation and the like, when selecting the particular material. Elastomeric materials well known to those skilled in the art which meet the particular requirements of the system for which the seal will be used in can be used for preparation of the seal. Examples include epichlorohydrin, fluoroelastomer, natural rubbers, ethylene and propylene, neoprene, butyl, nitrile- or silicone-based elastomers. Furthermore, such elastomers can be reinforced with a suitable reinforcing fabric, for example nylon, DACRON* polyester fiber, NOMEX* aramid fiber, or KEVLAR* polyamide fiber (*all trademarks of Du Pont de Nemours Company). Preferably, the seal is made from a fiber-reinforced elastomer. Most preferred are the nylon-reinforced silicone rubbers. The seal is generally tubular in a suitable shape to fit in the grooves of the mold case. In a more preferred embodiment, the tubular seal forms a circle.

The seal preferably has a means for introducing the pressure transmitting media to the seal. This means allows for the introduction of such media to increase the pressure in the seal, and the withdrawal of the pressure transmitting media to decrease the pressure. This means preferably communicates through an aperture to the outside of the mold casing and is connected to some means of controlling the pressure, for example, increasing or decreasing the pressure inside the seal, so as to allow inflating or deflating of the seal. The means for introducing the pressure transmitting medium may desirably be located in the side of the seal, or in a stem protruding from the seal, most preferably in the stem. The pressure transmitting medium can be any medium which can be pressurized and can transmit pressure to the seal. Preferably, the pressure transmitting medium is a fluid, including gases and liquids, capable of transmitting pressure. Preferred gases include air and the inert gases. Preferred liquids include water and hydrocarbon-based materials, for example viscous derivatives of crude oil.

In some embodiments there may be a gap between the seal and the groove in the mold casing when the seal is inflated. Under certain conditions, this gap may be filled with thermoset or thermoplastic material during the formation of the member. The filling of this gap with such material can create significant problems, especially where such thermoset or thermoplastic material which leaks into such gap remains in contact with the member and cures along with the member, thereby resulting in a misformed member. In some cases, it may be very difficult to remove the substrate with the member formed about it from the mold because of this. In such circumstances it is highly desirable to seal the gap between the seal and the groove in the mold casing. This sealing may be done using a highly viscous, lubricating material or an elastomeric adhesive, such as a silicone-based adhesive. It is preferable to use an elastomeric adhesive; a preferred elastomeric adhesive is a silicone rubber.

The method of this invention generally comprises a method for forming a member from a thermoset or thermoplastic resin around a substrate at some distance from the end of the substrate which comprises (A) placing the end of the substrate into a mold, wherein the mold comprises
  (i) a mold casing adapted for forming the member from a thermoset or thermoplastic material about the substrate at some distance from the end of the substrate;
  (ii) an inflatable seal adapted for forming a seal about the substrate when inflated at a distance from the end of the substrate such that thermoset or thermoplastic material is contained to the area of the substrate about which the member is to be formed;
  (iii) a means for inflating the seal such that the seal can form a seal about the substrate, which comprises a pressure transmitting medium which is introduced to the inflatable seal through means for introducing a pressure transmitting medium to the seal, wherein the means for introducing the pressure transmitting media communicates to the outside of the mold through an aperture in the mold casing;

(B) inflating the seal such that a seal is formed about the substrate sufficient to contain the thermoset or thermoplastic material to the region wherein the member is to be formed;

(C) contacting the thermoplastic or thermoset material with the substrate in the region where the member is to be formed;

(D) exposing the thermoset or thermoplastic material to conditions such that the material cures;

(E) deflating the seal; and (F) removing the substrate with the member formed about said substrate from the mold.

In that embodiment wherein the substrate is cylindrical with a flat end and the mold casing has a flat bottom the substrate is generally placed in a manner such that the flat end of the substrate rests on the flat bottom of the mold. In such an embodiment, the inflation of the seal thereby determines how far from the end of the substrate the member is formed. Generally, the seal is connected through its means for introducing the pressure transmitting media to some means for pressurizing the seal, thereby forming a seal about the substrate. Any pump which will sufficiently pressurize the pressure-transmitting medium in the seal is suitable. The inflation is done to a pressure such that a seal is formed above the substrate wherein the seal is sufficient to prevent communication of the thermoset or thermoplastic material between the two portions of the mold case. Preferably, the seal is inflated to a pressure of between about 15 and about 100 psig, more preferably between about 15 and about 40 psig, and most preferably between about 20 and about 40 psig.

Thereafter, the thermoplastic or thermoset material is contacted with the portion of the substrate about which the member is formed. In one embodiment, the thermoset or thermoplastic material is poured into that portion of the mold case adapted for forming the member about the substrate. Thereafter, the thermoset or thermoplastic material is exposed to conditions under which the material cures. Particularly, the temperature of the mold and thermoset material is that temperature at which the material cures. Preferable temperatures are between about 25° and 200° C., more preferably between about 25° and 100° C., and most preferably between about 50° and 80° C. Furthermore, the substrate and material from which the member is formed should be retained in the mold long enough for the material to cure. Once the thermoset or thermoplastic material has cured, the seal may be deflated by adjusting the means for controlling the pressure in the seal. More particularly, the pressure in the seal is decreased so as to allow the seal to pull back from the substrate. The substrate with the member formed thereon is then removed from the mold by any conventional means. In one embodiment, it may be desirable to coat the mold with a mold release compound so as to facilitate the removal of the substrate and member from the mold.

The invention may be further understood by reference to the figures. The figures illustrate a preferred embodiment of the mold of this invention. FIG. 1 is a side view of one preferred embodiment of the mold of this invention. This particular mold is useful for forming a flange on a tubesheet of a hollow fiber membrane device.

The bottom of the mold case (10) is flat and has centered therein an aperture (11) adapted for the introduction of a core of a hollow fiber device which protrudes out from the end of a tubesheet, so that the end of the tubesheet can rest on the flat bottom of the mold case (10). The aperture (11) communicates with cylindrica side (12) radiating axially from the bottom of the mold case adapted for protecting the core of the hollow fiber device. In the side walls of the mold, at some distance from the bottom of the mold case, is a groove (13) for seating the seal. Such groove (13) communicates completely about the mold case. In the groove is found a second aperture (14) adapted for the communication of a stem for the seal through side wall of the mold case. The stem is adapted for introducing a pressure transmitting medium to the seal. The mold case above the groove for the seal has a greater circumference than the flat bottom (10) of the mold. Above the groove is a lip (15) which with the seal, when inflated, seals to form the end or bottom of a member or flange formed about the hollow fiber device. The sides (16) of the mold case above the groove is tapered outwardly by 6° to the top of the mold case. The mold illustrated in FIG. 1 has a supporting piece (17) which extends down from the mold along the outside so as to provide support for the mold.

FIG. 2 represents a top view of the mold described in FIG. 1. The mold has a flat bottom surface (21) in which is found the aperture (22) in the bottom adapted for communication of the hollow fiber device core therethrough so as to allow the end of the hollow fiber device to rest on the flat bottom (21). At some distance from the bottom (21) is a lip (23) wherein the lip is above the groove in which the seal is seated. From the lip (23) to the top (25) of the mold case are the tapered sides (24) of the mold case.

FIG. 3 is a representation of a seal from the top. The seal is a circular shaped tube (31) with a stem (32).

FIG. 4 is a cutaway view of the seal. The figure illustrates the seal without inflation (41) and with inflation (42).

FIG. 5 demonstrates a cutaway view of the inflated seal in the groove of the mold case. The Figure demonstrates the seal when inflated (51) as sealed in the groove (52) in the mold case. The lip (53) above the groove in the seal is also illustrated. The side of the mold case below the groove (54) and the side above the groove (55) are illustrated. This figure demonstrates the gap (56) which may result between the lip (53) of the mold case forming the groove and the inflated seal (51). As described hereinbefore, it may be desirable to seal this gap to prevent the flow of the thermoset or thermoplastic material into the gap.

What is claimed is:

1. A method for forming a member from a thermoset or thermoplastic resin around a substrate at some distance from the end of the substrate which comprises
   (A) placing the end of the substrate into a mold, wherein the mold comprises
      (i) a mold casing adapted for forming the member from a thermoset or thermoplastic material about the substrate at some distance from the end of the substrate;
      (ii) an inflatable seal adapted for forming a seal about the substrate when inflated at a distance from the end of the substrate such that thermoset or thermoplastic material is contained to the area of the substrate about which the member is to be formed;
      (iii) a means for inflating the seal such that the seal can form a seal about the substrate, which comprises a pressure transmitting medium which is introduced to the inflatable seal through a means for introducing the pressure transmitting medium to the seal, wherein the means communicates to the outside of the mold through an aperture in the mold casing;
   (B) inflating the seal such that a seal is formed about the substrate sufficient to contain the thermoset or thermoplastic material to the region wherein the member is to be formed;
   (C) contacting the thermoplastic or thermoset material with the substrate in the region where the member is to be formed;
   (D) exposing the thermoset or thermoplastic material to conditions such that the material cures;
   (E) deflating the seal; and
   (F) removing the substrate with the member formed about said substrate from the mold.

2. The method of claim 1 wherein the pressure transmitting media is a fluid.

3. The method of claim 2 wherein the pressure transmitting media is a liquid.

4. The method of claim 2 wherein the inflatable seal is connected to a means for controlling the pressure in the seal.

5. The method of claim 4 wherein the inflatable seal is seated in a groove in the mold casing such that when the seal is inflated the seal protrudes from the groove in the mold casing and forms a seal about the substrate.

6. The method of claim 5 wherein the mold case has a flat bottom and the sides are arranged in a circular manner.

7. A method for forming a flange from a thermoset or thermoplastic resin about a hollow fiber membrane device at some distance from the end of the hollow fiber membrane device which comprises
   (a) placing the end of the hollow fiber membrane device into a mold, wherein the mold comprises
      (i) a mold casing adapted for forming the flange from a thermoset or thermoplastic material about the hollow fiber membrane device at some distance from the end of the hollow fiber membrane device;
      (ii) an inflatable seal adapted for forming a seal about the hollow fiber membrane device when inflated at a distance from the end of the hollow fiber membrane device such that the thermoset or thermoplastic material is contained to the area of the hollow fiber membrane device about which the flange is to be formed;
      (iii) a means for inflating the seal such that the seal can form a seal about the hollow fiber membrane device, which comprises a pressure transmitting medium which is introduced to the inflatable seal through a means for introducing the pressure transmitting medium to the seal, wherein the means commmunicates to the outside of the mold through an aperture in the mold casing;
   (b) inflating the seal such that a seal is formed about the hollow fiber membrane device sufficient to contain the thermoset or thermoplatic material to the region wherein the flange is to be formed;

(c) contacting the thermoplastic or thermoset material with the hollow fiber membrane device in the region where the flange is to be formed;

(d) exposing the thermoset or thermoplastic material to conditions such that the material cures;

(e) deflating the seal; and (f) removing the hollow fiber membrane device with the flange formed about said hollow fiber membrane device from the mold.

8. The method of claim 7 wherein the thermoset or thermoplastic material is a composition useful in hollow fiber tubesheet compositions.

9. The method of claim 8 wherein the thermoset or thermoplastic material is derived from a polyepoxide of a polyhydric phenol.

10. The method of claim 9 wherein the seal is inflated to a pressure of about 15 to about 100 psig step (B).

11. The process of claim 10 wherein the temperature for curing is between about 0° and 200° C.

* * * * *

UNITED STATES PATENT AND TRADEMARK OFFICE
CERTIFICATE OF CORRECTION

PATENT NO. : 4,724,113
DATED : February 9, 1988
INVENTOR(S) : Janet D. Lee

It is certified that error appears in the above-identified patent and that said Letters Patent is hereby corrected as shown below:

```
Column 10, Claim 10, line 8, after "psig" insert the word
   --in--.
```

Signed and Sealed this

Eighteenth Day of October, 1988

Attest:

DONALD J. QUIGG

*Attesting Officer*  *Commissioner of Patents and Trademarks*